Sept. 22, 1959     C. A. PARK ET AL     2,905,346
ENSILAGE HANDLING IMPLEMENT
Filed June 10, 1957     3 Sheets-Sheet 1

INVENTORS.
Chester A. Park
Hallie W. Sprague
BY
ATTORNEY

Sept. 22, 1959 C. A. PARK ET AL 2,905,346
ENSILAGE HANDLING IMPLEMENT
Filed June 10, 1957 3 Sheets-Sheet 2

INVENTORS.
Chester A. Park
Hallie W. Sprague
BY
*[signature]*
ATTORNEY.

Sept. 22, 1959  C. A. PARK ET AL  2,905,346
ENSILAGE HANDLING IMPLEMENT
Filed June 10, 1957  3 Sheets-Sheet 3

INVENTORS.
Chester A. Park
Hallie W. Sprague
BY
ATTORNEY.

United States Patent Office 2,905,346
Patented Sept. 22, 1959

2,905,346

ENSILAGE HANDLING IMPLEMENT

Chester A. Park, Merriam, Kans., and Hallie W. Sprague, Greenville, Tex., assignors to Agricultural Products, Inc., Merriam, Kans., a corporation of Kansas Application June 10, 1957, Serial No. 664,554

11 Claims. (Cl. 214—508)

This invention relates to material handling equipment especially adapted for use in the loading and unloading of ensilage, and has for its primary object the inclusion as a part thereof, novel material handling mechanism capable of not only loosening the material from the stack thereof, but loading the material properly in a carrier therefor and ultimately feeding the material from the carrier to a point of use.

Normally, several distinct, laborious and time-consuming steps are necessary for removing ensilage from a trench silo for example and ultimately depositing the same in feed boxes or the like accessible to livestock. Initially, the heavily packed material must be dug loose following which the workmen must load the loosened material from the bottom of the silo into a truck, trailer or wagon box. Finally, the silage is distributed by hand into the feed bunks or other points of use.

Accordingly, it is an important object of the present invention to provide material handling mechanism as a part of the implement which is capable of loosening the ensilage whereby the same will fall to an underlying, open top body, thereby requiring no digging action or manual labor of any kind.

Another important object of the instant invention is to associate the material handling mechanism with the open top body in a manner to cause the said mechanism to perform a second step of shifting the material toward one end of the body thereby filling the latter as the mechanism swings to the lowermost end of its path of travel.

A further object of the present invention is to provide a body that is tiltable so that the lowermost open end thereof may be lowered against the stack of ensilage in a position for receiving the gravitating loosened silage.

A still further object of the present invention is to combine with all of the component parts above mentioned, a swingable bottom forming a part of the body and arranged to raise the ensilage and press the same against the material handling mechanism to the end that the latter unloads the material into a laterally extending chute or spout.

Still another object of the present invention relates to the novelty of the material handling mechanism itself, and more particularly, to the way in which it utilizes a plurality of flight elements mounted for continuous travel and operating to loosen the material by a flipping action as the flight elements travel around the terminal end of the boom structure.

Many additional objects will be made clear as the following specification progresses, reference being had to the accompanying drawings, wherein:

Fig. 4 is a fragmentary, detailed, cross-sectional view taken on line IV—IV of Fig. 2; and Fig. 5 is a detailed, cross-sectional view taken on line V—V of Fig. 1.

Figure 1:
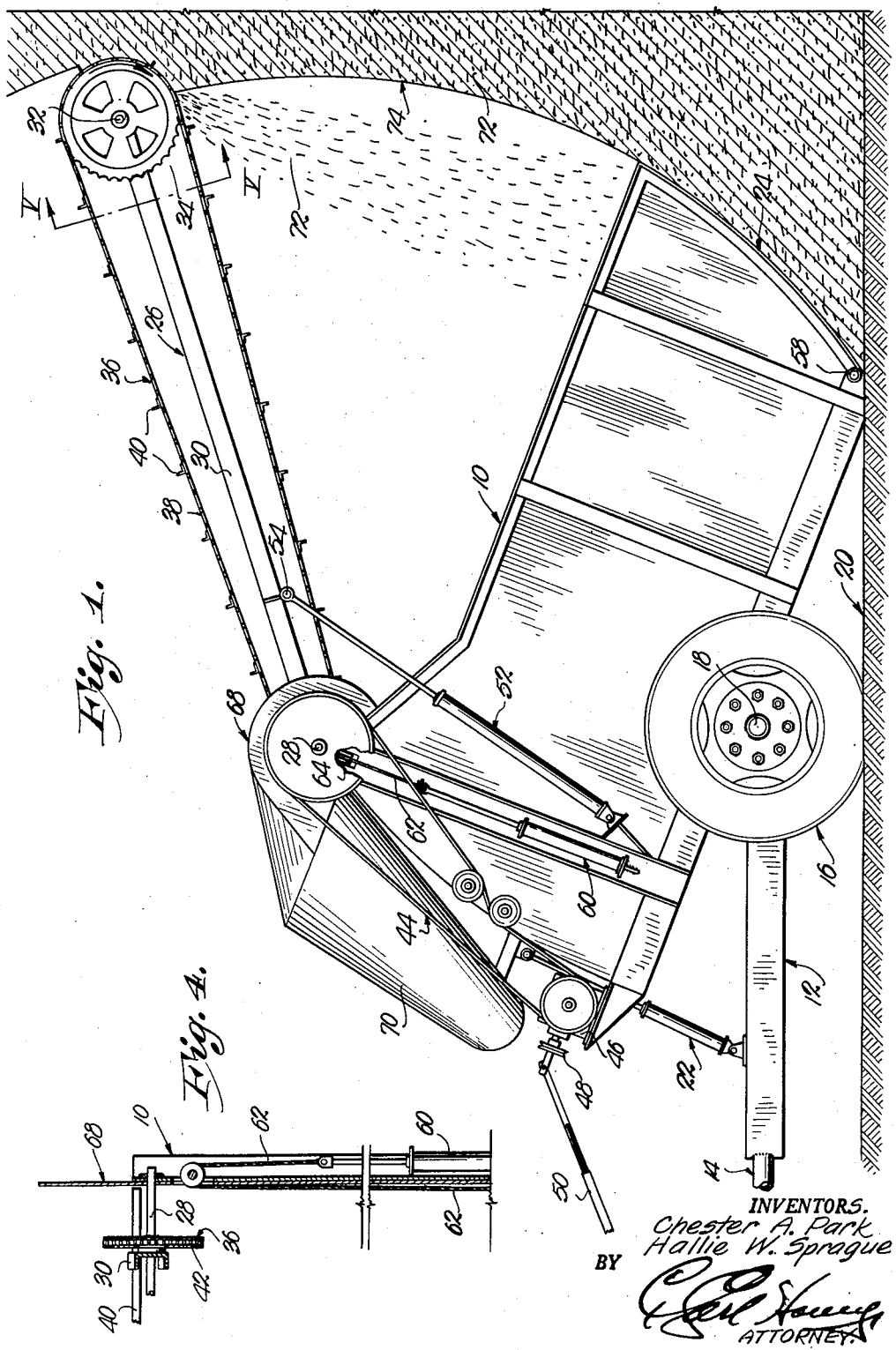
Fig. 1 is a side elevational view of an ensilage handling implement made pursuant to the present invention.
Figure 3:
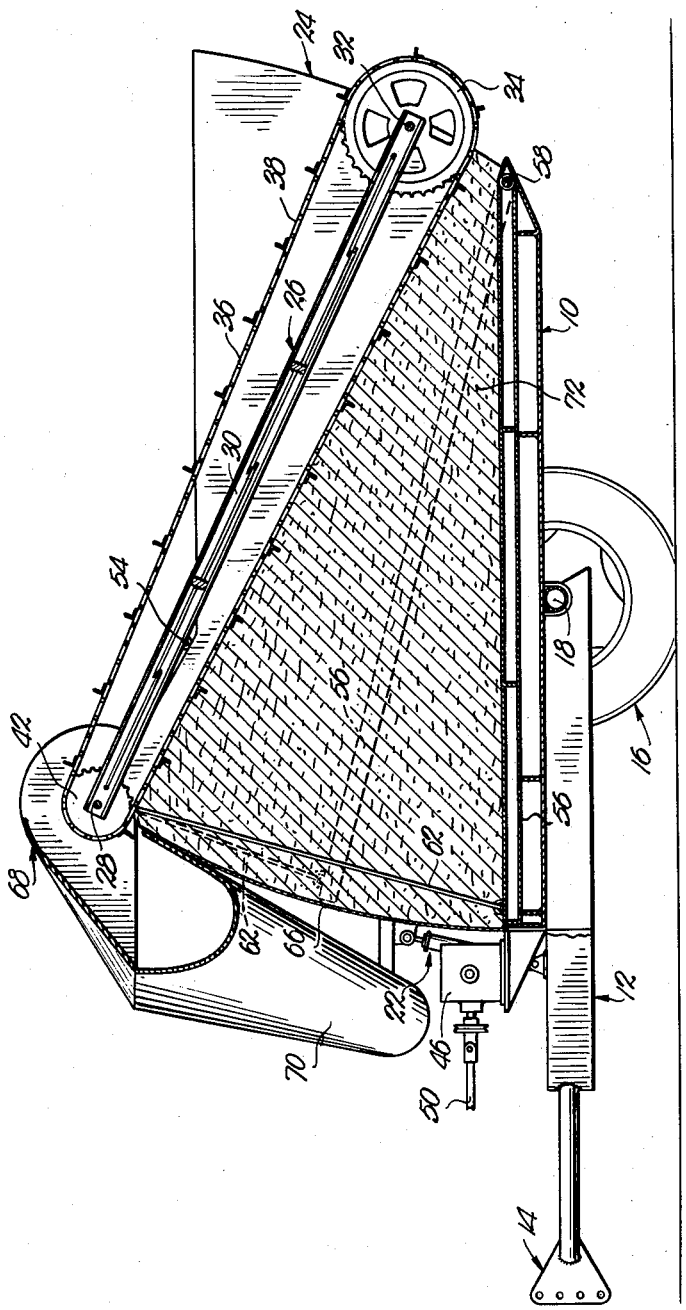
Fig. 3 is a vertical, cross-sectional view through the implement showing the same loaded with ensilage and with the boom structure in a position for holding the material in place.

As clearly depicted by the drawings, the implement about to be described is in the nature of a mobile vehicle including an open top body broadly designated by the numeral 10, carried by a wheeled frame 12 for tilting movement as is clear by comparing Figs. 1 and 3.

Frame 12 is adapted to be towed by a tractor, truck or the like by virtue of the provision of a suitable tongue and hitch assembly 14. A wheel and axle assembly 16 supports the frame 12 and it is about the horizontal axis of the axle 18 of assembly 16 that the body 10 is mounted for vertical swinging movement. Consequently, the rearmost open end of the body 10 may be lowered to the bottom 20 of the trench silo illustrated schematically in Fig. 1 upon actuation of push and pull means in the nature of hydraulic piston and cylinder means 22 interconnecting frame 12 and body 10 adjacent the forwardmost end of the latter. The rearmost ends 24 of the side walls of the body 10 have a convex configuration as seen in Figs. 1 and 3 for purposes hereafter to be made clear.

Elongated boom structure broadly designated by the numeral 26, is mounted on the body 10 adjacent the forwardmost and uppermost end thereof for vertical swinging movement into and out of body 10 and to this end, there is provided a horizontal shaft 28 forming a part of the structure 26 and about which the latter swings.

Structure 26 includes a suitable frame 30 interconnecting shaft 28 and a shaft 32, the latter of which rotatably receives spaced sprocket wheels 34 around which is trained an endless material handling mechanism broadly designated by the numeral 36.

Mechanism 36 is made up of a pair of spaced, endless, flexible members such as chains 38 that are in turn interconnected by a plurality of spaced, horizontal flight elements 40, the latter of which are preferably L-shaped transversely thereof as seen in Figs. 1 and 3.

The innermost end of the structure 26 is likewise provided with a pair of chain-receiving sprocket wheels 42 rigid to shaft 28 and around which are trained the chains 38.

The mechanism 36 is driven by belt and pulley means 44 operably connecting shaft 28 with the mechanism of a gear box 46 carried by body 10 forwardly of the latter. Such gear mechanism may be driven by a suitable prime mover mounted on the body 10 (not shown) and operably connected with pulley 48 on the input shaft of the gear box mechanism 46. Alternately, through use of a universal shaft 50, mechanism 36 may be driven from the power take-off of the vehicle that is employed to tow the implement forming the subject matter of the instant invention.

The boom structure 26 and the continuously traveling mechanism 36 carried thereby, may be raised and lowered by push-pull means in the nature of hydraulic piston and cylinder assemblies 52 interconnecting body 10 and frame 30. Notable at this juncture is that the uppermost ends of the assemblies 52 are interconnected by a shaft or the like 54, traversing frame 30 and serving as a stop, thereby limiting the extent of downward travel of the structure 26 when the shaft 54 comes to rest upon the upper edges of body 10.

Body 10 is also provided with a movable platform or bottom 56 mounted through the medium of a shaft 58 at the lowermost and rearmost end of the body 10 for vertical swinging movement about the horizontal axis of shaft 58. Here again, hydraulic piston and cylinder means 60 secured to the body 10 are employed to raise the bottom 56 through the medium of cables 62 interconnecting the forwardmost end of bottom 56 with the assemblies 60 and passing over pulleys 64 at the uppermost and forwardmost end of body 10. It is to be noted that the front end 66 of body 10 is preferably arched to conform with the path of travel of the forward end of bottom 56, but that such end 66 terminates below the shaft 28 and provides clearance for the mechanism 36 as the latter is caused to travel in a direction that becomes obvious upon noting the arrow on the sprocket wheel 34 in Fig. 1.

Figure 2:
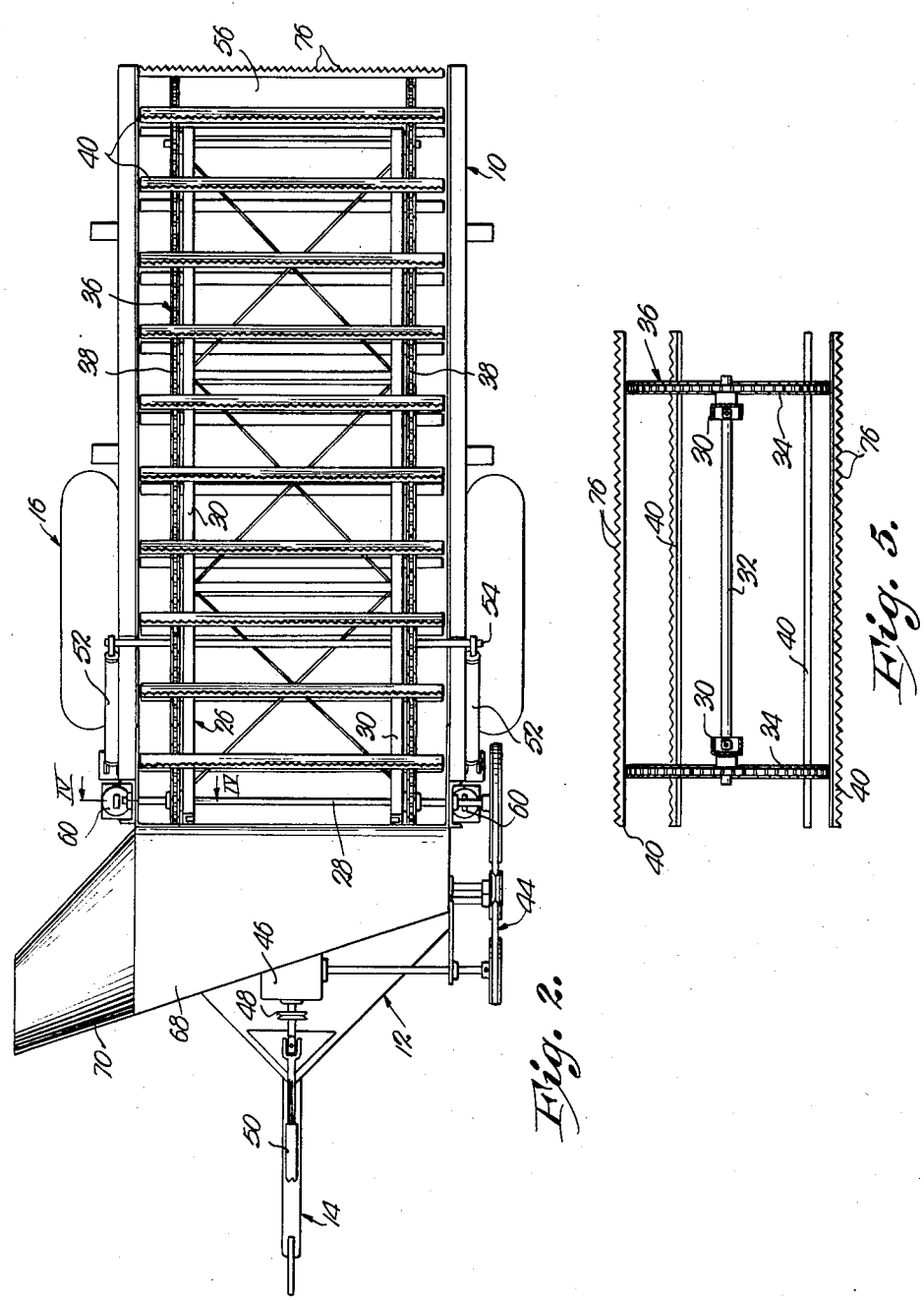
Fig. 2 is a plan view thereof.

The innermost end of the structure 26 and the mechanism 36 adjacent the uppermost and forwardmost end of body 10, is partially enclosed by a hood 68 having the top thereof cut away as shown in Fig. 3 to permit swinging of the structure 26 to the position shown in Fig. 1. The hollow hood 68 terminates in a lateral chute or spout 70 that extends downwardly and forwardly from the hood 68 as shown in Figs. 1–3 and communicates with the hood 68.

*Operation*

After the implement has been initially placed in use to remove ensilage 72 from the silo, there is presented a concave end wall 74 in the stack of ensilage 72. Thus, when the implement is backed into the silo along the bottom 20 thereof, and upon tilting of the body 10 to the position shown in Fig. 1 by actuation of assemblies 22, the lowermost and rearmost end of the body 10 rests upon the bottom 20 and the convex ends 24 bear against the arcuate end 74 of the stack of ensilage 72.

Prior to such positioning of the implement, structure 26 is raised to the uppermost end of its path of travel or at least to the top of the stack of ensilage 72. Thereupon, as the mechanism 36 is placed in operation for continuous travel through belt and pulley means 44, the structure 26 is gradually and progressively lowered toward the body 10 through use of the push-pull assemblies 52.

The elongated, L-shaped flight elements 40, move successively against the ensilage 72, thereby loosening the same for gravitation into the body 10 as illustrated in Fig. 1. The action of the elements 40 as they travel around the sprocket wheels 34 is unique in that the same tend to impart a flipping snap action to the ensilage 72, thereby loosening the latter as distinguished from a digging operation. In this connection it is to be pointed out that the heavily packed material can be removed from the stack 72 more easily by such loosening operation than by digging since it is but necessary to disentangle the same and overcome the packed condition thereof whereupon the gravitational flow into the body 10 is continuous as the structure 26 is lowered.

It is manifest that the material will form a pile in the body 10 at the rearmost lowered end thereof, but as the mechanism 36 approaches the body 10, the pile of material will be moved by the mechanism 36 toward the front end 66 of the body 10.

Fig. 3 of the drawings shows clearly that the structure 26 extends beyond the rearmost end of the body 10 and, therefore, as the mechanism 36 shifts the load toward the front end 66 of the body 10, mechanism 36 continues to loosen the material in the stack 72 until such time as shaft 54 comes to rest on the upper end of body 10. By this time, the sprocket wheels 34 are closely adjacent the rearmost and lowermost end of the body 10 and, therefore, adjacent the bottom 20 of the silo, thereby moving all of the loosened material into the body 10 with no appreciable amount of loosened material remaining on the floor or bottom 20 of the silo.

The body 10 is then raised or tilted back to its normal position as shown in Fig. 3, and it is seen that inasmuch as the structure is adapted to move into the body 10 between the side walls thereof, the material 72 is held in place within the body 10 by the structure 26 during travel from the silo to a point of unloading.

It can be appreciated at this point that a second sweep of the stack 72 may be made if desired to more nearly fill the body 10 and inasmuch as the ensilage tends to cling together, the weight and pressure of the structure 26 thereon will hold the same in place, notwithstanding the fact that the rear end of the body 10 is open.

During unloading, the mechanism 36 is caused to travel in the same direction as above described with respect to loosening and loading of the material. The flight elements 40 thereupon operate to move the material 72 from the body 10 over the uppermost edge of the end wall 66 into the hood or hopper 68. If the structure 26 is in the position shown in Fig. 3 at the commencement of unloading, it is unnecessary to further actuate the assemblies 52. However, in the case of a fuller load as above described, the structure 26 may be gradually lowered to the lowermost end of its path of travel during the initial unloading operation.

The material 72 is gradually and progressively fed to the flight elements 40 during unloading by actuating the assemblies 60 to raise the bottom 56 in the manner illustrated by dotted lines in Fig. 3. It can be appreciated that such raising of the bottom 56 presses the material 72 against the continuously moving flight elements 40 and when the latter travel at a predetermined speed, the rate of unloading will depend in part upon the amount of pressure that is exerted on the material 72 by operation of the assemblies 60.

Manifestly, the material flows by gravity from the hood 68 into the spout 70 and the operator need merely move the vehicle alongside feed bunks for example, thereby causing the material to be distributed evenly into such material receivers as the material emanates from the spout 70. By the time the bottom 56 has been swung to the uppermost end of its path of travel into substantial parallelism with the lower stretch of mechanism 36, all of the materialy 72 will have been fed by the elements 40 into the hopper 68 over the uppermost edge of wall 66.

The outermost, longitudinal edges of the flight elements 40 may be provided with a series of teeth 76 if desired, as best seen in Fig. 5, to facilitate the operations thereof in all of their functions as above described.

Having thus described the invention what is claimed as new and desired to be secured by Letters Patent is:

1. In combination with a mobile vehicle having an open top body, elongated boom structure carried by the vehicle for vertical movement toward and away from said top and including endless material handling mechanism adapted for continuous travel and provided with a plurality of flight elements for loosening the material from a stack thereof as the structure descends whereby the material falls into the body said structure being adapted to move into the body whereby said mechanism conveys the material toward one end of the body, said body having a bottom adapted to be raised to move the material toward said mechanism whereby the latter unloads the material from the body at said one end thereof.

2. In combination with a mobile vehicle having a body provided with an open top and an open end, the latter of which is adapted to be lowered, elongated boom structure carried by the vehicle for vertical movement toward and away from said top and including endless material handling mechanism adapted for continuous travel and provided with a plurality of flight elements for loosening the material from a stack thereof as the structure descends whereby the material falls into the body, said structure being adapted to move into the body whereby said mechanism conveys the material toward the opposite end of the body said body having a bottom adapted to be raised to move the material toward said mechanism whereby the latter unloads the material from the body at said opposite end thereof.

3. In combination with a mobile vehicle having an open top body provided with a bottom, elongated boom structure mounted on the vehicle at one end thereof adjacent said top for vertical swinging movement into and out of said body, toward and away from said bottom and including endless material handling mechanism adapted for continuous travel and provided with a plurality of flight elements for loosening the material from a stack thereof as the structure descends whereby the material falls into the body, said bottom being vertically swingable toward said mechanism into substantial parallelism therewith when said structure is within the body.

4. In combination with a mobile vehicle having a frame and an open top body, tiltable on the frame and provided with a bottom, elongated boom structure mounted on the vehicle at one end thereof adjacent said top for vertical swinging movement into and out of said body, toward and away from said bottom and including endless material handling mechanism adapted for continuous travel and provided with a plurality of flight elements for loosening the material from a stack thereof as the structure descends whereby the material falls into the body, said bottom being pivotally mounted on the body adjacent the opposite end thereof for vertical swinging movement toward and away from said mechanism.

5. In combination with a wheeled vehicle having a frame, an open top body having an open end, a closed end and a bottom pivotally mounted thereon adjacent said open end for vertical swinging movement toward and away from said open top; means mounting the body for vertical swinging movement on the frame whereby to permit lowering said open end to the ground; elongated boom structure mounted on the body at said closed end adjacent the open top for vertical swinging movement into and out of said body, toward and away from said bottom and including endless material handling mechanism adapted for continuous travel and provided with a plurality of flight elements for loosening the material from a stack thereof as the structure descends whereby the material falls into the body.

6. The invention as set forth in claim 5 wherein said structure extends outwardly beyond the open end of the body when the same is within the latter.

7. The invention as set forth in claim 5 wherein is provided means for raising and lowering said structure, including push-pull apparatus for pressing the material against the bottom.

8. The invention as set forth in claim 7 wherein is provided means for raising the bottom to press the material against the mechanism when the latter is in the body.

9. The invention as set forth in claim 8 wherein is provided means for directing material laterally of the body as the same is conveyed over the top of said closed end by said mechanism.

10. In combination with a frame provided with a platform, means supporting the frame for movement to and from a position lowering one end of the platform; elongated boom structure carried by the frame for vertical movement toward and away from said platform and including endless material handling mechanism adapted for continuous travel and provided with a plurality of flight elements for loosening the material from a stack thereof as the structure descends whereby the material falls onto the platform; and means mounting said platform on the frame for movement toward said mechanism whereby the latter unloads the material from the opposite end of the platform.

11. In combination, a support; a frame provided with a platform; means mounting the frame on the support for swinging movement to and from a position lowering one end of the platform; means interconnecting the support and the frame for swinging the latter; elongated boom structure carried by the support for vertical movement toward and away from said platform and including endless material handling mechanism adapted for continuous travel and provided with a plurality of flight elements for loosening the material from a stack thereof as the structure descends whereby the material falls onto the platform; and means mounting the platform on the frame for swinging movement of the opposite end of the platform upwardly toward said mechanism whereby the latter unloads the material from said opposite end of the platform.

References Cited in the file of this patent

UNITED STATES PATENTS

| | | |
|---|---|---|
| 1,226,573 | Nelson | May 15, 1917 |
| 1,505,476 | London | Aug. 19, 1924 |
| 2,752,140 | Joy | June 26, 1956 |
| 2,844,240 | Buck | July 22, 1958 |